(12) United States Patent  
Lim et al.

(10) Patent No.: US 7,566,440 B2  
(45) Date of Patent: Jul. 28, 2009

(54) METAL OXIDE CATALYSTS

(75) Inventors: Myong Hoon Lim, Kyunggi-do (KR); Tae Hee Park, Seoul (KR); Jae Hoi Gu, Kyunggi-do (KR); Yongho Yu, Kyunggi-do (KR)

(73) Assignee: Samsung Engineering Co., Ltd., Seoul (KR)

( * ) Notice: Subject to any disclaimer, the term of this patent is extended or adjusted under 35 U.S.C. 154(b) by 160 days.

(21) Appl. No.: 11/162,108

(22) Filed: Aug. 29, 2005

(65) Prior Publication Data

US 2007/0003475 A1    Jan. 4, 2007

Related U.S. Application Data

(63) Continuation-in-part of application No. 11/160,571, filed on Jun. 29, 2005, now Pat. No. 7,309,479.

(51) Int. Cl.
*C01B 3/06* (2006.01)
*C09K 3/00* (2006.01)

(52) U.S. Cl. .............. 423/648.1; 252/182.32; 252/183.13; 252/183.14; 423/657

(58) Field of Classification Search ........... 423/594.1, 423/648.1, 657; 502/314; 252/182.32, 183.13, 252/183.14
See application file for complete search history.

(56) References Cited

U.S. PATENT DOCUMENTS 2,570,882 A * 10/1951 Stiles ................... 264/654

| | | |
|---|---|---|
| 3,985,865 A | 10/1976 | Hohne |
| 4,093,450 A * | 6/1978 | Doyle et al. ................ 75/365 |
| 4,826,796 A | 5/1989 | Erekson et al. |
| 5,350,879 A | 9/1994 | Engel et al. |
| 5,736,111 A * | 4/1998 | Saegusa ................. 423/594.1 |
| 5,804,329 A | 9/1998 | Amendola |
| 6,124,499 A | 9/2000 | Hibst et al. |
| 6,528,450 B2 * | 3/2003 | Wu et al. ................. 502/240 |
| 6,534,033 B1 | 3/2003 | Amendola et al. |
| 6,777,571 B2 | 8/2004 | Chaturvedi et al. |
| 6,916,945 B2 | 7/2005 | Gaffney et al. |
| 6,982,287 B2 * | 1/2006 | Wang et al. .............. 518/715 |
| 7,118,728 B2 * | 10/2006 | Paris et al. ................. 423/632 |

(Continued)

FOREIGN PATENT DOCUMENTS

GB    1320204 A    6/1973

(Continued)

OTHER PUBLICATIONS

Kojima et al, "Hydrogen generation using sodium borohydride solution and metal catalyst coated on metal oxide", International Journal of Hydrogen Energy 27 (2002) 1029-1034. (no month).*

(Continued)

*Primary Examiner*—Wayne Langel
(74) *Attorney, Agent, or Firm*—Joseph Hyosuk Kim; JHK Law

(57) ABSTRACT

The present invention provides metal oxide catalysts and preparation method thereof, and its application for hydrogen generation from a metal borohydride solution. More particularly, provided are an activation method of a newly prepared catalyst and a regeneration method of a deactivated metal oxide catalyst.

9 Claims, 6 Drawing Sheets

U.S. PATENT DOCUMENTS

| | | | |
|---|---|---|---|
| 2001/0022960 A1* | 9/2001 | Kojima et al. | 423/657 |
| 2001/0053467 A1 | 12/2001 | Kaneko et al. | |
| 2002/0183405 A1* | 12/2002 | Pederzani et al. | 518/715 |
| 2003/0073574 A1* | 4/2003 | Johansen et al. | 502/307 |
| 2003/0144367 A1* | 7/2003 | Jacobus Van Berge et al. | 518/715 |
| 2004/0033194 A1 | 2/2004 | Amendola et al. | |
| 2004/0180784 A1 | 9/2004 | Hagemeyer et al. | |
| 2004/0242941 A1* | 12/2004 | Green et al. | 568/910 |
| 2005/0232857 A1* | 10/2005 | Lomax et al. | 423/652 |

FOREIGN PATENT DOCUMENTS

| | | | |
|---|---|---|---|
| JP | 54-038290 A | 3/1979 | |
| JP | 58-119345 A | 7/1983 | |
| RU | 2 048 909 C1 | 11/1995 | |

OTHER PUBLICATIONS

Risbud et al., "Wurtzite CoO", Chem. Mater. 2005, 17, 834-838.

Kaufman and Sen, "Hydrogen Generation by Hydrolysis of Sodium Tetrahydroborate", J. Chem. Soc. Dalton Trans. 1985, 307-313.

Kojima et al., "Hydrogen Generation using Sodium Borohydride Solution and Metal Catalyst coated on Metal Oxide", Int. J. Hydrogen Energy, 2002, 27, 1029-1034.

* cited by examiner

METAL OXIDE CATALYSTS

This is a continuation-in-part application of U.S. patent application Ser. No. 11/160,571, filed on Jun. 29, 2005, in the U.S. Patent and Trademark Office, the disclosure of which is incorporated herein in its entirety by reference.

BACKGROUND OF THE INVENTION

1. Field of Invention

The present invention relates to a metal oxide or mixed-metal oxide catalyst for hydrogen generation from metal borohydride. The invention also relates to a method of making, sintering, activating a metal oxide catalyst, regenerating a deactivated metal oxide catalyst, and the use of the catalyst for oxidative reaction on various chemical systems.

2. Description of the Related Art

Transition metal oxides have been employed as a catalyst in a variety of chemical processes, such as oxidation (U.S. Pat. No. 6,124,499), NOx treatment (U.S. Pat. No. 6,916,945), oxidation and ammoxidation of an alkane (U.S. Pat. No. 6,777,571), transesterification (U.S. Pat. No. 5,350,879) and oxidative coupling of methane (U.S. Pat. No. 4,826,796). Nonetheless, metal oxides or mixed-metal oxides have not been investigated or used for the application of hydrogen generation from metal borohydride solution in our best knowledge. On the whole, the catalytic activity of the metal oxides is closely associated with preparation conditions, electronic structures, degree of crystallization, oxidation states, surface area, and so on. Furthermore, the careful control of surface structures, compositions, phase or particle sizes of the metal oxides may play a critical role for diverse chemical catalyses.

Hydrogen is one of fundamental gases, which is largely necessitated in synthetic chemical companies. In aspect of clean energy, hydrogen has been gained much attention for the applications of fuel cells, hydrogen combustion engines, turbines etc. Due to recent increasing demands of hydrogen gas, several different methods of hydrogen storage systems have been developed, which include compressed or liquefied hydrogen, $H_2$ adsorption on carbon nano-tube, activated carbon, or metals or mixed metal alloys. Compressed or liquefied $H_2$ is relatively easy to control the $H_2$ flow rate and pressure, but involves potential safety issues. The adsorption methods for $H_2$ storage also have many problems including low hydrogen density per unit volume, deterioration of the materials, and slow response time for $H_2$ generation, etc. Recently, hydrogen generation from aqueous borohydride solution using a catalyst has stirred many interests in scientific communities since it is not only stable in normal operation condition, but also releases hydrogen gas in safe and controllable way.

It has been widely known that hydrogen gas is generated by hydrolysis of sodium borohydride in the aid of acid, transition metals, or their salts (Kaufman, C. M. and Sen, B., J. Chem. Soc. Dalton Trans. 1985, 307-313). U.S. Pat. No. 6,534,033 disclosed that a transition metal catalyst was employed to generate hydrogen gas from a stabilized metal borohydride solution. Those metal catalysts, such as ruthenium, rhodium, or cobalt metal supported on various substrates exhibited high activity for hydrogen generation. Other metal catalysts, including silver, iron, nickel, copper, and so on are often inactive or less active for hydrogen generation at room temperature based on unpublished tests. Some metal catalysts such as copper and nickel, showed improved activity after they were heated in nitrogen at 600-800 degree C. Usage of high performance metal catalyst, such as ruthenium, rhodium or platinum, is cost prohibitive for one-time use in various applications.

According to a recent publication (Kojima, Y. et al., Int. J. Hydrogen Energy, 2002, 27, 1029-1034), Toyota Central R&D Laboratories, Inc. reported that a catalyst containing platinum and $LiCoO_2$ has a high catalytic activity for hydrogen generation due to the synergistic effects of finely divided platinum metal on the metal oxide framework. However, this system still uses a precious metal like platinum, which is not attractive for practical application due to high production cost. From a practical point of view, a high performance catalyst for hydrogen generation having low production cost is highly advantageous.

SUMMARY OF THE INVENTION

The present invention provides single metal oxide or multiple mixed-metal oxide catalysts for the use of hydrogen generation from a metal borohydride solution. Also provided is a method for activating those metal oxide catalysts and regenerating deactivated catalysts.

The present invention also provides a method of making supported and unsupported metal oxide catalysts. The process of making unsupported catalysts comprises: shaping catalysts with wet metal paste or dry metal powder; thermal or hydrothermal oxidation of the catalysts; and sintering the catalysts. Another route for making metal oxide catalysts is thermal decomposition of metal or mixed metal compounds. The process of making supported metal oxide catalysts comprises: impregnation of metal compounds on a substrate; the formation of metal oxides by thermal decomposition of the metal compounds. In another embodiment, the present invention provides that thermal oxidation of the metal coated on a substrate, which is pre-prepared by an electroless plating or electroplating method.

The invention also provides a process of hydrogen generation comprising a metal oxide catalyst, a container of the catalyst, and a metal borohydride solution with or without stabilizer.

In one aspect, the present invention is directed to a metal oxide catalyst for hydrogen generation comprising mono, multiple oxidation states, or mixtures thereof. The metal oxide catalyst may be in unsupported form, which may be optionally in the form of powder, chip, disk, rod, wire, mesh, bead, monolith, strip with porosity, or without porosity. The metal oxide catalyst may be in contact to a support and in one embodiment, the support may be metals, ceramics, polymers, glass, fibers, fabrics, textiles, wovens, nonwovens, fibers, alloys, zeolites, molecular sieves, ion exchange resins, graphite, metal oxides, metal carbides, metal boride, metal nitride, or mixtures thereof.

In another aspect, the invention is also directed to an oxidation method of metals or mixed-metals for hydrogen generation catalysts in a temperature of about 200 to about 1200 degrees Centigrade (preferably 400 to 800 degree Centigrade). The oxidation of metals may be carried out by thermal, hydrothermal, steam process, or a combination thereof. The oxidizing and sintering the metal oxide may be carried out in a microwave oven, an electric high temperature furnace, an electric heating oven, a heat gun, a hot plate, or a combination thereof.

The invention is further directed to a method of making the metal oxide catalyst from a metal compound comprising decomposition of the metal compound by heating. In one aspect, the metal compound may be metal fluoride, metal chloride, metal bromide, metal iodide metal nitrate, metal carbonate, metal hydroxide, metal borate, metal acetate, metal oxalate, or an organometallic compound. The method may also comprise a pyrolysis process and/or a glycine nitrate process in air.

The invention may also include a process of hydrogen generation using the metal oxide catalyst, comprising contacting the metal oxide catalyst with a solution comprising metal borohydride, a base, and proton donor solvent. The metal borohydride may be lithium borohydride, sodium borohydride, potassium borohydride, ammonium borohydride, tetramethyl ammonium borohydride, or mixtures thereof. The base may be lithium hydroxide, sodium hydroxide, potassium hydroxide, ammonium hydroxide, sodium sulfide, sodium zincate, sodium gallate, sodium silicate, or mixtures thereof. The proton donor solvent may be water, alcohol, ethylene glycol, glycerol, methanol, ethanol, isopropanol, isobutanol, propanol, propanediol, butanol, or mixtures thereof.

In still another aspect, the invention may also include a method of regenerating deactivated metal oxide catalyst for hydrogen generation comprising: (a) sonicating the catalyst in deionized (DI) water; (b) washing the catalyst with DI water; and (c) heating the catalyst at about 200-1200 degree C. The heating may be accomplished by a microwave oven, a high temperature furnace, an electric heating oven, a heat gun, a hot plate, or a combination thereof.

BRIEF DESCRIPTION OF THE DRAWINGS

The present invention will become more apparent to those of ordinary skill in the art by describing in detail preferred embodiment thereof with reference to the attached drawings in which.

DETAILED DESCRIPTION OF THE INVENTION

Figure 1:
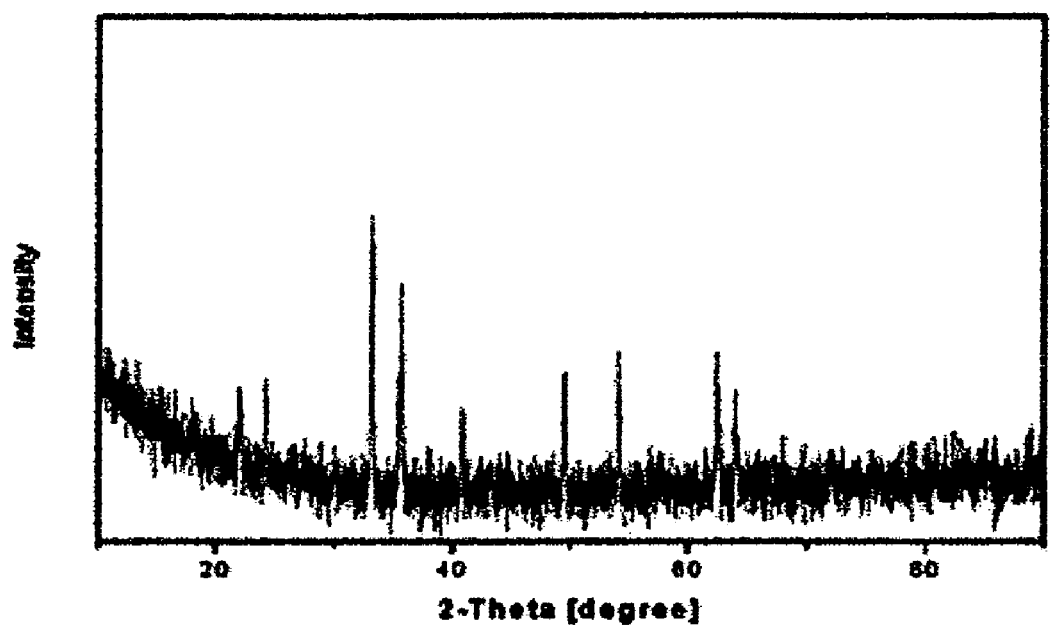
FIG. 1 shows an X-ray diffraction pattern of an iron oxide catalyst according to the present invention.
Figure 2:
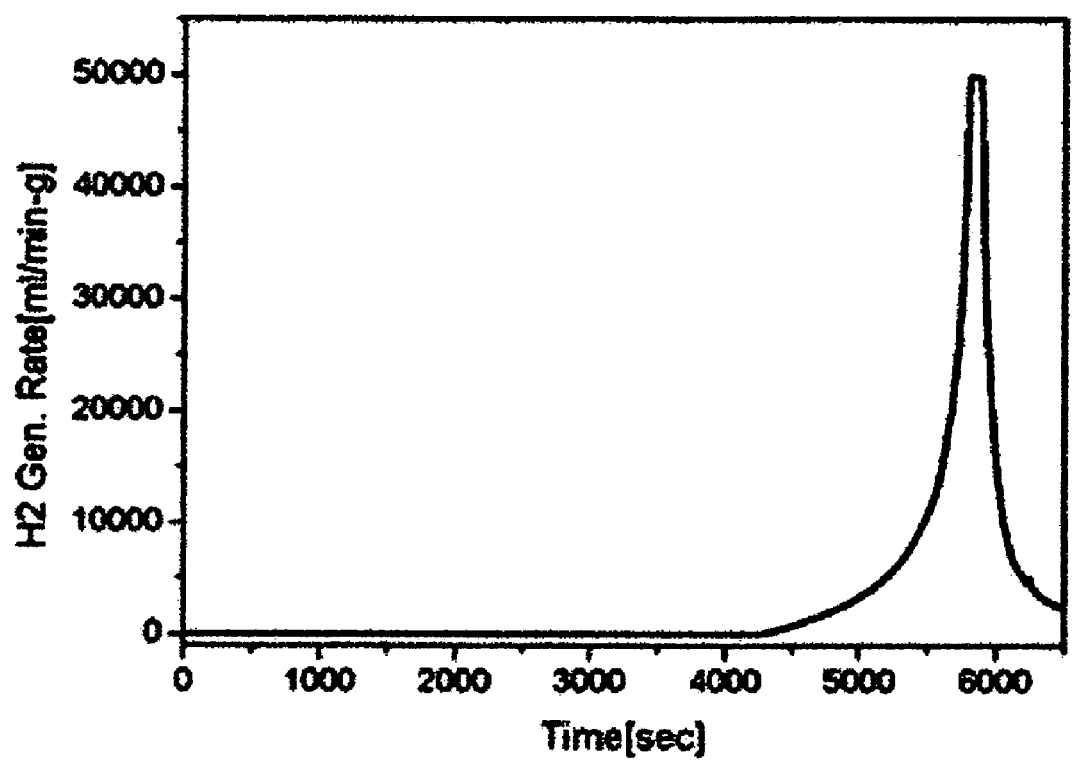
FIG. 2 shows a graph of hydrogen flow rate versus time for a $Co_3Fe_2$-oxide catalyst prepared from a glycine-nitrate process.
Figure 3:
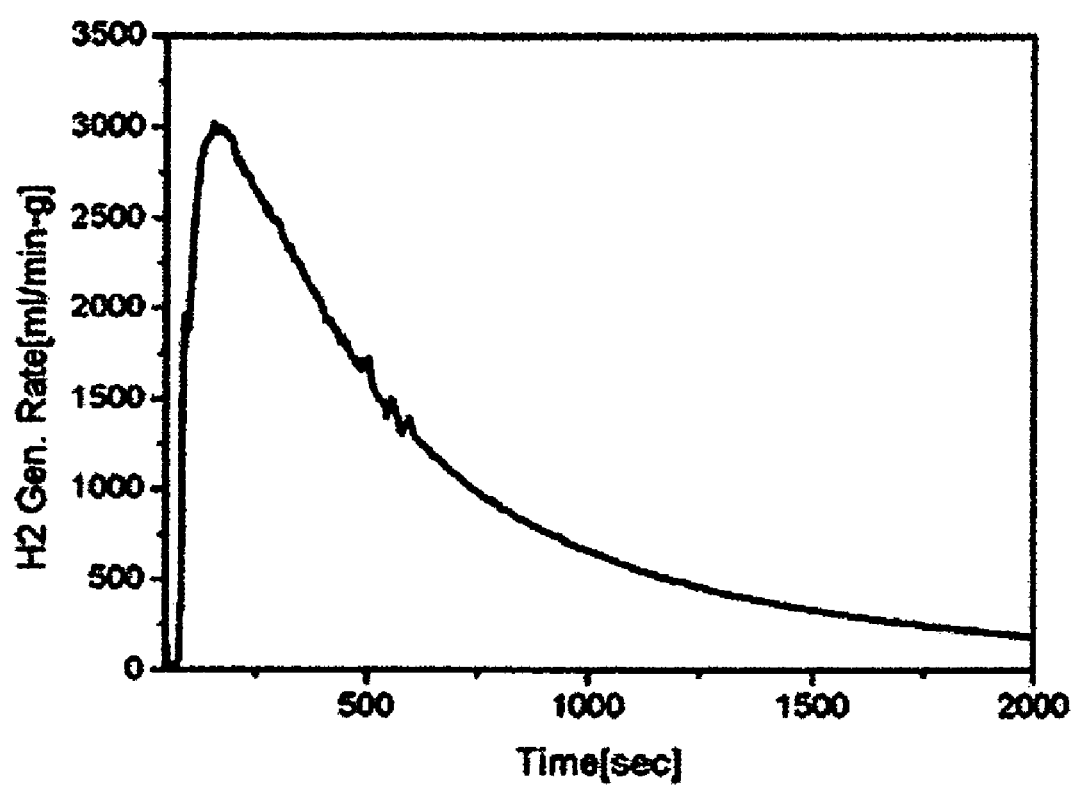
FIG. 3 shows a graph of hydrogen flow rate versus time for a $CoFe_4$-mixed oxide catalyst prepared from thermal oxidation in a microwave oven.
Figure 4:
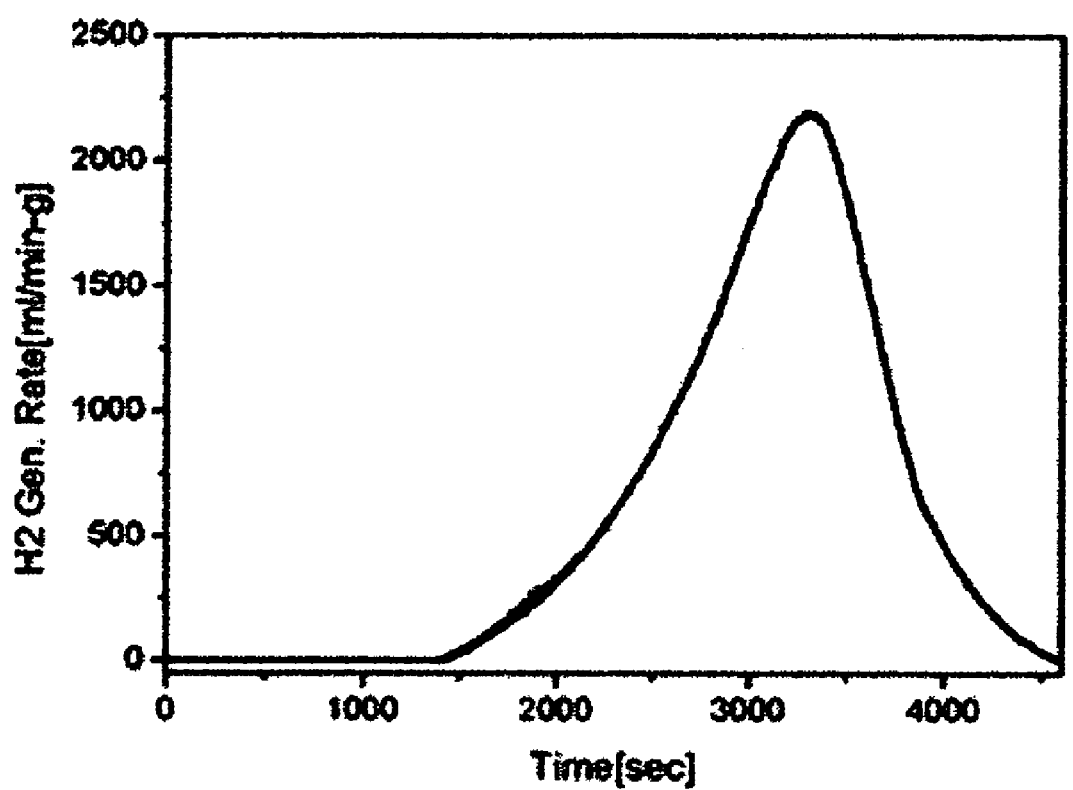
FIG. 4 shows a graph of hydrogen flow rate versus time for a partially sintered Fe-oxide catalyst prepared from thermal oxidation in a microwave oven.
Figure 5:
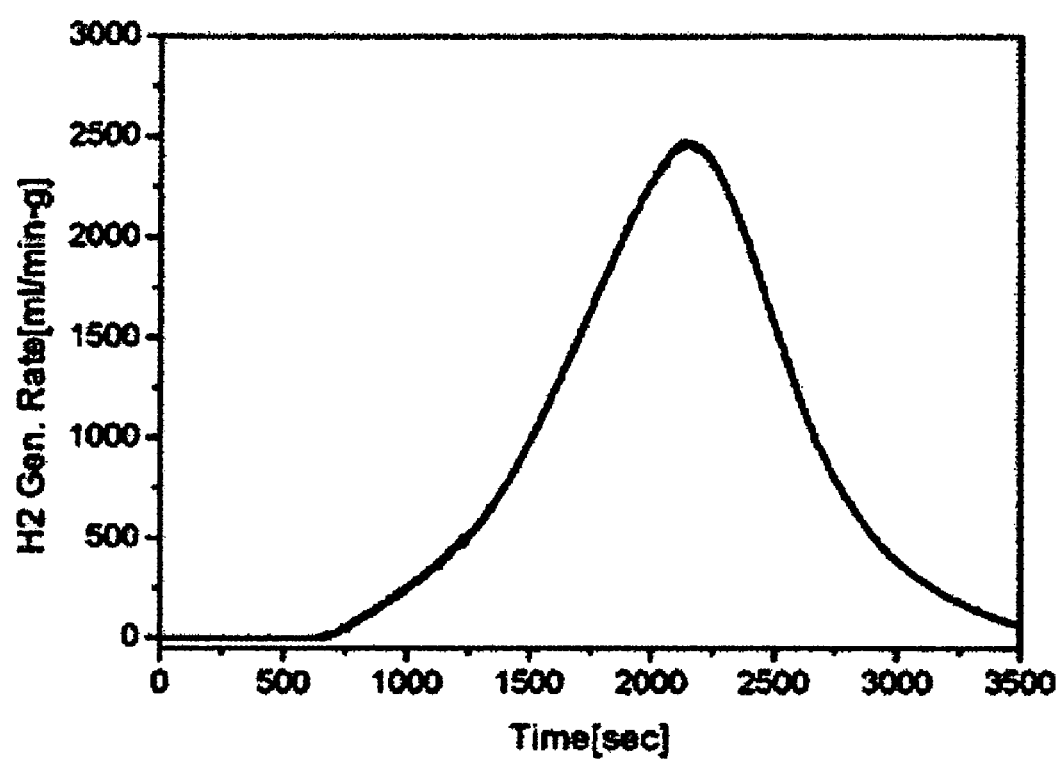
FIG. 5 shows a graph of hydrogen flow rate versus time for a sintered Fe-oxide catalyst prepared from thermal oxidation in a microwave oven, and sintered at 1150 degree C.

The present invention is directed to provide a cost-effective metal oxide catalyst for hydrogen generation having a high performance catalytic activity. The present invention also provides a method of making a supported and an unsupported catalyst based on metal oxides and a process of hydrogen generation.

The present invention will now be described more fully hereinafter with reference to the accompanying figures, in which preferred embodiments of the invention are shown. This invention may, however, be embodied in different forms and should not be construed as limited to the embodiments set forth herein.

The metal oxide catalyst for hydrogen generation comprises one or more transition metal oxide comprising oxides of metal elements selected from a group of Sc, T, V, Cr, Mn, Fe, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Er, Tm, Yb, Lu, and mixtures thereof, wherein transition metal oxide has mono, multiple oxidation states, or mixtures thereof. More preferably, the transition metal oxides herein comprising oxides of metal elements selected from a group of Fe, Co, Ni, Cu, Ru, Rh, and mixtures thereof). In another embodiment, the metal oxide catalyst comprises one or more transition metal oxides coupled with one or more non-transition metal oxides, wherein non-transition metal comprises Li, Na, Sr, K, Rb Cs, Fr, Mg, Ca, Sr, Ba, Ra, Al, Si, Fe, Ga, In, Sn, Pb or mixtures thereof. Some mixed-metal oxides show an inhibiting effect on hydrogen generation. Oxides of metal elements selected from Mo, Zn, V, W, and so on possessing an agtanotic effect on hydrogen generation are also useful for controlling hydrogen flow rates. By coupling with these metal elements with active metal oxides containing elements of Fe, Co, Cu, Ni, Ru, Rh and mixtures thereof, desirable hydrogen flow rate and controlled activation time can be achieved for specific applications.

For high performance catalytic activity and cost-effectiveness, the present invention provides that the hydrogen generation catalyst herein refers to, but not particularly limited to, mixed-metal oxides comprising oxides of metal elements selected from Fe, Co, Cu, Ni, Ru, Rh, and a combination thereof. The oxidation states of those metals may be mono, multiple, or mixtures thereof. These mixed-metal oxide catalysts show not only higher catalytic activity due to a synergistic effect, but also much shorter activation time compared to single metal oxide catalysts. In case of the convenient isolation of used catalysts, the metal or mixed-metal oxide may be coupled with ferromagnetic materials.

The metal oxide catalyst can have a form of powder, wire, chip, disk, rod, strip, bead, monolith with/without porosity, or metal oxide particles supported on a substrate comprising metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof.

The preparation of metal oxide may be carried out using a method of thermal or hydrothermal oxidation of metal or a decomposition process of a variety of metal compounds. An unsupported metal oxide catalyst is prepared by thermal oxidation of metal in an oxidative environment such as air or ozone. The temperature of thermal oxidation typically is in the range of 200~1200 degree C. (preferably 400~800 degree C.). The color of oxidized metal may be an indication of degree of its surface oxidation. The simplest way to make metal oxide is a microwave assisted thermal oxidation process in the air. The microwave heating process not only oxidizes metal powder, but also sinters the metal oxide particles within 0.5-20 minutes depending on the power (preferably 500-950 W) of the microwave. Alternatively, metals may be oxidized and sintered by open frame or electric discharge heating in the air or ozone. Structure analysis of those metal oxide samples are carried out by using a method of X-ray diffraction (XRD). FIG. 1 shows an XRD pattern indicating the complete transformation of iron oxide from iron metal by heating in both microwave oven and electric high temperature furnace.

Alternative way of making metal oxide is to oxidize metal in an electric furnace at a temperature of 200~1200 degree C. (preferably 400~800 degree C.) in the air or ozone for 10 minutes to 12 hours (preferably 1 to 2 hours). Metal oxide also can be prepared by hydrothermal oxidation or steam oxidation. These processes may take more time to complete compared with the microwave heating process, and often require additional thermal treatments for the use of a catalyst for hydrogen generation.

Another embodiment of the invention is to make metal oxide catalyst by thermal decomposition of metal compounds. Precursors of metal oxide catalysts may be, without limitation, metal fluoride, metal chloride, metal bromide, metal iodide, metal nitrate, metal carbonate, metal hydroxide, metal borate, metal acetate, metal oxalate, or an organometallic compound. For the preparation of metal oxide or mixed-metal oxide powder with high surface area, a glycine-nitrate method is employed. The size and porosity of the metal oxide particles can be controlled by adjusting the amount of glycine.

A supported metal oxide catalyst is prepared through a decomposition process of a metal compound that is bound to, entrapped within, and coated on a substrate comprising metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof. Another preparation method of a supported catalyst is the oxidation of coated metal on a substrate by heating in the air or ozone. Coating of metal film on a substrate can be achieved by an electroplating or electrodeless plating process.

A process of hydrogen generation according to the present invention is initiated by contacting a metal oxide catalyst with a solution comprising metal borohydride, a base, and proton donor solvent. A base used herein plays a role to stabilize metal borohydride in a solution. A common base used in a metal borohydride solution is lithium hydroxide, sodium hydroxide, potassium hydroxide, ammonium hydroxide, sodium sulfide, sodium zincate, sodium gallate, sodium silicate, and mixtures thereof. Hydrogen generation from a metal borohydride solution results from solvorolysis of metal borohydride by proton donor solvent. Thus, any proton donor solvents can be used for the solvorolysis of metal borohydride. The preferred solvent is water and any alcohol comprising without limitation, ethylene glycol, glycerol, methanol, ethanol, isopropanol, isobutanol, propanol, propanediol, butanol, and mixtures thereof. Another process of hydrogen generation starts by mixing a proton donor solvent with a solid system comprising a metal oxide catalyst and solid metal borohydride. Hydrogen generation of this process may be controlled by the amount of the added solvent to a solid mixture of the metal oxide catalyst and metal borohydride.

It often takes a few minutes to generate a hydrogen gas from a metal borohydride solution when a freshly made metal oxide catalyst is employed. The surface activation is engaged by immersion of the catalyst in a metal borohydride solution for 1~30 minutes. Once the catalyst is activated, an instant increase of the amount of hydrogen gas is observed. To accelerate the surface activation of the freshly made metal oxide catalyst, heating is desirable. The preferred heating temperature is in the range of about 30~100 degree C. (preferably 40~80 degree C.). However, the activation process is not necessary unless the process of hydrogen generation needs immediate action. In general, activation of metal oxide catalysts may be related with the amount of the catalysts, concentrations of metal borohydride and stabilizer, and particle sizes of the catalysts. Mixed-metal oxide catalysts often showed shorter activation time for hydrogen generation.

The plots of hydrogen flow rate vs. time of various metal oxide catalysts are shown in FIGS. 2-5. In the case of $Co_3Fe_2$-oxide catalyst prepared using a glycine-nitrate process according to the present invention, the hydrogen flow rate hit a peak of ~50000 ml/min-g without temperature control (see FIG. 2). On the other hand, the $CoFe_4$-oxide produced from a microwave assisted thermal oxidation process revealed the maximum hydrogen flow rate of 3065 ml/min-g (see FIG. 3), but its activation commenced immediately. The maximum hydrogen flow rates of Fe-oxide samples are 2193 and 2473 ml/min-g for partially sintered Fe-Oxide (microwave heating) and sintered Fe-Oxide (microwave heating+additional heating at 1150 degree C.), respectively (see FIGS. 4-5). Although it seemed that additional thermal treatments did not make big differences on the hydrogen flow rates, sintered catalysts are more favorable in terms of convenience of use and mechanical strength. In the system of the Co—Fe oxides prepared from a glycine-nitrate process, decreasing the amount of Fe contents elevated the maximum hydrogen flow rates, but it remained constant after the molar ratio of Co/Fe of 1.5 (see FIG. 6). The hydrogen flow rate may depend on concentration of sodium borohydride, the particle size and amount of the catalysts, compositions of hetero metals and so on. Maximum hydrogen flow rates of various mixed metal oxides are summarized in Table 1. Unlike a Co—Fe oxide system, Fe- or Co-oxide coupled with zinc oxide had no catalytic activity on hydrogen generation. Other metal oxides coupled with Co-oxides are relatively weak catalytic activities on hydrogen generation.

TABLE 1

Maximum Hydrogen Flow Rate (ml/min-g) of Coupled Metal Oxide Catalysts

|  | V-Oxide | Cu-Oxide | Zn-Oxide | Mo-Oxide |
| --- | --- | --- | --- | --- |
| Fe-Oxide | 0 | 453 | 0 | 0 |
| Co-Oxide | 227 | 13260 | 0 | 2153 |

After several uses of the metal oxide or mixed-metal catalyst, its catalytic activity may decline due to surface contamination and/or partial reduction. The deactivated metal oxide catalyst can be re-activated through the following process: (1) sonicating the catalyst in deionized (DI) water; (2) rinsing the catalysts with DI water several times; and (3) heating the catalyst in a hot plate, a microwave oven or an electric furnace at 200~1200 degree C. (preferably 400~800 degree C.).

This invention is more specifically illustrated by following Examples, which are not meant to limit the invention.

EXAMPLES

Example 1

Preparation of a Shaped $CoFe_4$-oxide Catalyst Using a Microwave Assisted Thermal Oxidation Process 1.7678 g of Co metal powder and 4.468 g of Fe metal powder were mixed with a mechanical agitator for 10 minutes. Paste of Co-4Fe metal was prepared by mixing the Co-4Fe metal powder with deionized (DI) water. The paste was spread out flat (approximately 2-3 mm thick) on a ceramic plate and chopped into 2-3 mm pieces. The shaped paste was dried and heated in a microwave oven with a power of 950 W for 10 minutes.

Example 2

Preparation of an Unsupported Iron Oxide Catalyst Using a Microwave Assisted Thermal Oxidation Process An iron oxide catalyst was prepared by thermal oxidation of 20 g of iron metal powder in a microwave oven for 10 minutes. The power of the microwave was set to 950 W. Upon generating the microwave, the iron metal powder started glowing red-hot within a minute. The microwave heating of the sample continued for 10 minutes. After completion of the heating, the resulting sample showing black was partially consolidated.

Example 3

Preparation of Mixed-metal Oxide Catalysts Using a Microwave Assisted Thermal Oxidation Process Various mixed-metal oxide catalysts were prepared by thermal oxidation of mixed-metal powder in a microwave oven for 10 minutes. The other preparation conditions were the same as example 1. For the preparation of mixed-metal oxide catalysts, two kinds of metal powder mixture with a molar ratio of 50:50 were mixed by using a mechanical agitator before heating. TABLE 2 summaries a combination of coupled metal oxides with a molar ratio of 50:50.

TABLE 2

| Summary of coupled metal oxides with a molar ratio of 50:50 | | | | |
|---|---|---|---|---|
| | Vanadium (V) | Copper (Cu) | Zinc (Zn) | Molybdenum (Mo) |
| Iron (Fe) | FeV-oxide | FeCu-oxide | FeZn-oxide | FeMo-oxide |
| Cobalt (Co) | CoV-oxide | CoCu-oxide | CoZn-oxide | CoMo-oxide |

Example 4

Preparation of a Shaped Iron Oxide Catalyst Using a Microwave Assisted Thermal Oxidation Process 30 g of iron metal powder was spread out flat on a ceramic plate and packed with a flat plastic plate. The packed flat iron metal powder was chopped into 2-3 mm pieces, and heated in a microwave oven with a power of 950 W for 10 minutes. The further sintering of the iron oxide catalyst was carried out by heating at 1150 degree C. in an electric furnace for 2 hours. The sintered sample was crushed and grounded for the X-ray diffraction (XRD) analysis. FIG. 1 shows a XRD pattern of synthesized iron oxide sample in a microwave oven. The XRD phase shows no sign of the Fe metal phase implying complete oxidation.

Example 5

Preparation of an Unsupported Iron Oxide Catalyst in a High Temperature Furnace Iron metal powder contained in an alumina crucible was placed in a high temperature furnace and heated at 800 degree C. for 2 hours in air. The resulting sample was oxidized and sintered simultaneously.

Example 6

Figure 6:
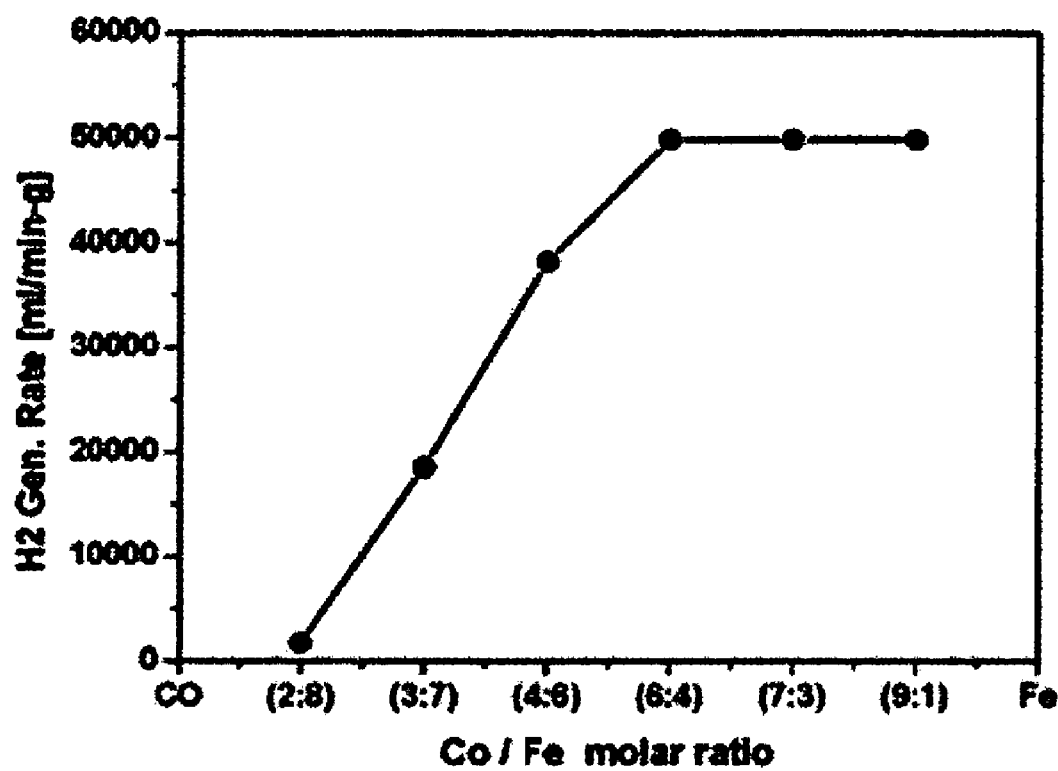
FIG. 6 shows a plot of maximum hydrogen flow rates versus a Co/Fe molar ratio for Co—Fe oxide catalysts prepared from a glycine-nitrate process.

Preparation of an Unsupported Cobalt-iron Oxide Catalyst Using a Glycine-nitrate Combustion Process Cobalt-iron oxide catalysts with various molar ratios of cobalt and iron were synthesized using a glycine-nitrate process. In this process, an aqueous solution containing glycine and mixture of either cobalt nitrate/iron chloride or cobalt chloride/iron nitrate was prepared and heated until excess water had boiled away. Continuous heating of the remaining material resulted in self-ignition, which generated fine black powder. The molar ratios of glycine and metal salts in this invention were 1:1. FIG. 6 shows a plot of maximum hydrogen flow rates of Co—Fe oxide catalysts having a molar ratio of Co:Fe from 0.25 to 9.

Example 7

Preparation of a Supported Iron-cobalt Oxide Catalyst

2 M solution of cobalt and iron nitrates was prepared by dissolving equal molar cobalt and iron nitrates in de-ionized water. 2 ml of the resulting solution was introduced into a 100 ml beaker containing 3 g of molecular sieves (Yakuri Pure Chemicals Co. LTD, Osaka, Japan). The cobalt and iron ions impregnated molecular sieves were dried in an oven at 100 degree C. for 1 hour, and consecutively heated on a hot plate with a maximum temperature setting for 1 hour.

Example 8

Hydrogen Generation Experiments

Hydrogen generation experiments were carried out to measure a flow rate of hydrogen. Several metal oxide and mixed-metal oxide samples were employed. The experiment was carried out by adding 20 ml of a sodium borohydride solution containing 16 wt. % $NaBH_4$, 3.5 wt. % NaOH, and 80.5 wt. % of DI water to a reaction vessel containing a certain amount (0.01-0.3 g) of metal or mixed-metal oxide powder samples. The hydrogen flow rate was measured using a mass flow controller interfaced with a personal computer. FIGS. 2-6 shows a graph of the hydrogen flow rates of the various metal oxide catalysts.

All of the references cited herein are incorporated by reference in their entirety.

Those skilled in the art will recognize, or be able to ascertain using no more than routine experimentation, many equivalents to the specific embodiments of the invention specifically described herein. Such equivalents are intended to be encompassed in the scope of the claims.

What is claimed is:

1. A composition comprising sodium borohydride in an aqueous solution and a catalyst consisting essentially of cobalt oxide-iron oxide capable of generating hydrogen from $NaBH_4$, wherein the molar ratio of cobalt to iron ranges from 6:4 to 9:1.

2. The composition of claim 1, wherein said cobalt oxide-iron oxide has mono, multiple oxidation states, or mixtures thereof.

3. The composition of claim 1, wherein said cobalt oxide-iron oxide has an unsupported form.

4. The composition of claim 3, wherein said cobalt oxide-iron oxide is in the form of powder, chip, disk, rod, wire, mesh, bead, monolith, strip with porosity, or strip without porosity.

5. The composition of claim 1, wherein the cobalt oxide-iron oxide is in contact with a support.

6. The composition of claim 5, wherein the support is selected from the group consisting of: metals, ceramics, polymers, glass, fibers, fabrics, textiles, wovens, nonwovens, fibers, alloys, zeolites, molecular sieves, ion exchange resins, graphite, metal oxide, metal carbide, metal boride, metal nitride, and mixtures thereof.

7. A process of hydrogen generation using the composition of claim 1, said process comprising contacting the composition with a base and a proton donor solvent.

8. The process of hydrogen generation of claim 7, wherein the base is selected from the group consisting of: lithium hydroxide, sodium hydroxide, potassium hydroxide, ammonium hydroxide, sodium sulfide, sodium zincate, sodium gallate, sodium silicate, and mixtures thereof.

9. The process of hydrogen generation of claim 7, wherein the proton donor solvent is selected from the group consisting of: water, alcohol, ethylene glycol, glycerol, methanol, ethanol, isopropanol, isobutanol, propanol, propanediol, butanol, and mixtures thereof.

* * * * *